UNITED STATES PATENT OFFICE.

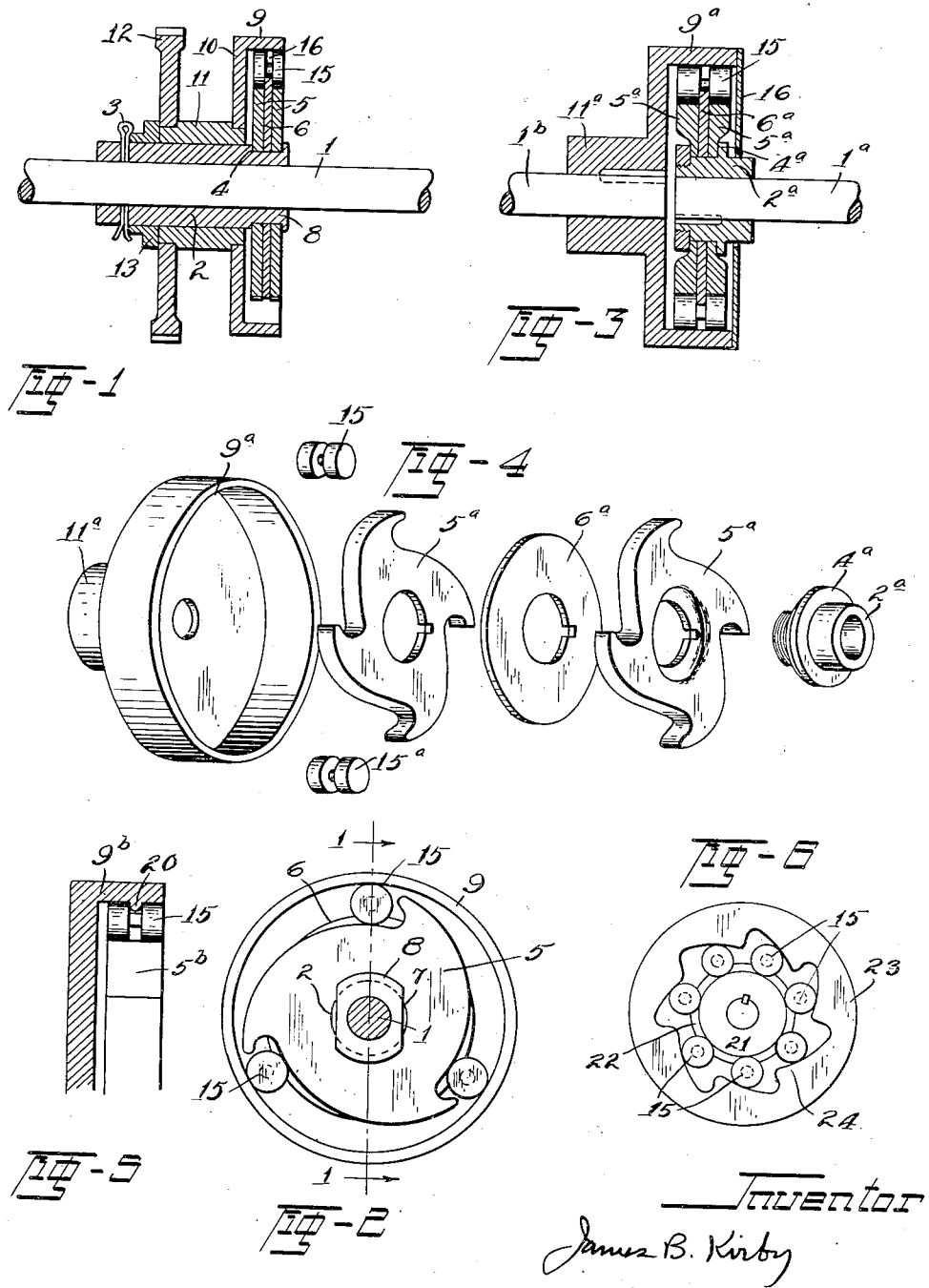

JAMES B. KIRBY, OF CLEVELAND, OHIO.

CLUTCH.

1,362,011.  Specification of Letters Patent.  Patented Dec. 14, 1920.

Application filed April 10, 1919. Serial No. 289,045.

*To all whom it may concern:*

Be it known that I, JAMES B. KIRBY, a citizen of the United States, residing at Cleveland, in the county of Cuyahoga and State of Ohio, have invented a certain new and useful Improvement in Clutches, of which the following is a full, clear, and exact description, reference being had to the accompanying drawings.

This invention relates to an improvement in clutches, and has especial reference to the type of such device known as a roller clutch. Such a clutch ordinarily comprises a cylindrical surface opposed to a spiral surface, between which surfaces rollers are placed so as to become wedged therebetween for the purpose of establishing a driving connection between the members upon which said surfaces are formed. Experience indicates that such cylindrical rollers, unless of considerable length, offer the tendency of becoming canted or turned angularly in their seats thus obstructing the smooth and regular operation of the device; and this objection has been so notable as to cause many designers to employ balls instead of rollers excepting where the latter can be made very long, and notwithstanding the smaller strength and life of the ball clutch owing to its decreased area of engagement.

The objects of this invention are the provision of a clutch so constructed as to avoid the possibility of the rollers becoming canted or displaced. The provision of new and simplified means for holding together the parts of such clutch; the provision of a clutch so constructed as to be very easily and cheaply manufactured; while further objects and advantages of the invention will become apparent as the description proceeds.

In the drawings accompanying and forming a part of this application I have shown my improvements as applied to a one-way roller clutch or silent ratchet. Figure 1 is a sectional view of a clutch embodying my improvements; Fig. 2 is a right hand elevation thereof; Fig. 3 is a sectional view through a slightly modified form of clutch; Fig. 4 is a perspective view showing the parts of such a clutch in separated relation; and Figs. 5 and 6 illustrate modifications of my invention.

In the embodiment shown in Figs. 1 and 2, 1 represents the shaft and 2 represents a sleeve secured rigidly to such shaft by suitable means such as a cotter pin 3. At the opposite end of the sleeve from such cotter pin the exterior of the same is reduced as at 4 for the reception of two cam plates 5—5 separated by a circular washer 6 whose diameter is intermediate the greater and lesser diameters of the cams. These plates are rigidly secured to the sleeve in any suitable manner, the mode here shown consisting of forming the exterior of the sleeve with flattened portions 7 to which conform the holes in the plates to prevent rotation, and upsetting the ends of the sleeve as shown at 8 to prevent removal of those plates.

The other member of the clutch consists of an interiorly cylindrical part 9 overlying and spaced from the edges of the cam plates, and here shown as having a flat web 10 rigidly attached to the sleeve 11 which is journaled on the outside of the sleeve 2 and also carries the gear 12 by which motion is to be transmitted to some other member not shown. The web 10 is secured to the sleeve 11 in any suitable manner such for example as that employed for securing the cam plates. The rollers are illustrated at 15, and are of cylindrical shape, each being formed with an external groove 16 in which is received the edge of the plate 6. The depth of this groove is such as to permit the roller to move to the smallest portion of its corresponding cam, while the diameter of the plate 6 is such that even when the roller is in the outermost position permitted by the part 9, the plate 6 still projects sufficiently into said groove to prevent endwise movement.

In the device shown in Fig. 3 two separate shafts are shown, 1$^a$ and 1$^b$, arranged in axial alinement. To the shaft 1$^a$ is keyed the sleeve 2$^a$ formed with the external rib 4$^a$ and having secured thereto the cam members 5$^a$—5$^a$ and circular plate 6$^a$. The opposite member of the clutch has a rim 9$^a$ and hub 11$^a$, the latter being keyed to the shaft 1$^b$. The rollers 15 are the same as before, and in this case I have shown the clutch parts as housed by a circular plate 16, which however is spaced at all times out of contact with the rollers.

In Fig. 5 the cam shown at 5$^b$ consists of but a single piece, the opposing member 9$^b$ being here shown as having an internal rib 20 which enters the groove in the roller 15. In the modification shown in Fig. 6, the inner member 21 is made circular and has an external rib 22 which enters the grooves on the various rollers 15, while the outer member 23 is formed with internal cam surfaces 24 coöperating with the rollers.

In all these devices, the rollers possess this grooved, bifurcated, or dumb-bell shape, and are held against longitudinal movement by a central rib carried by one member of the clutch. This guiding and holding effect being produced upon the middle part of the roller the latter is not affected by any tendency to cant the same such as would be produced by the action of a plate engaging one or the other end thereof. Besides the construction here shown permits the parts to be made, at least in small sizes, largely from sheet metal stampings. It will be understood that many changes can be made in details of construction without departing from my inventive idea.

Having thus described my invention, what I claim is:

1. In a roller clutch, in combination, a circular plate, a pair of cam plates secured one to each side of said first plate with the cam surfaces thereof in alinement, a member having a cylindrical surface opposed to such cam surfaces, and rollers disposed between said cam surfaces and said cylindrical surface, the diameter of said cylindrical plate being intermediate the largest and smallest diameters of the cam surfaces and each roller being formed between its ends with a groove into which the edge of said first plate projects.

2. In a roller clutch, in combination, a pair of concentric sleeves, a pair of sheet metal cam plates and a circular sheet metal plate rigidly affixed to one sleeve, the circular plate being located between the cam plates and having a radius intermediate the smallest and greatest radii of the cams, a circular sheet metal plate rigidly affixed to the other sleeve and having a flange overhanging said first plates, and a plurality of rollers arranged around said cam plates, each roller having a groove receiving the edge of said circular plate.

In testimony whereof, I hereunto affix my signature.

JAMES B. KIRBY.